(12) United States Patent
Spina

(10) Patent No.: US 7,296,663 B2
(45) Date of Patent: Nov. 20, 2007

(54) AUTOMOTIVE WHEEL ANTI-GYRO

(76) Inventor: Mario Joseph Spina, 310 Cabin Rd. SE., Vienna, VA (US) 22180

(*) Notice: Subject to any disclaimer, the term of this patent is extended or adjusted under 35 U.S.C. 154(b) by 297 days.

(21) Appl. No.: 11/146,327

(22) Filed: Jun. 7, 2005

(65) Prior Publication Data

US 2006/0289252 A1  Dec. 28, 2006

Related U.S. Application Data

(60) Provisional application No. 60/655,398, filed on Feb. 24, 2005.

(51) Int. Cl.
*B60T 1/10* (2006.01)
*B60T 11/00* (2006.01)
(52) U.S. Cl. .................................... 188/18 A; 192/218
(58) Field of Classification Search ......... 188/218 XL; 180/219; 280/217; 192/218, 221.1; 74/5 R, 74/5.4, 5.8, 5.9
See application file for complete search history.

(56) References Cited

U.S. PATENT DOCUMENTS 1,945,874 A * 2/1934 Weaver .................... 280/89.1
3,756,338 A * 9/1973 Goodridge ................. 180/219
3,787,066 A * 1/1974 Hautier ..................... 280/217
4,712,806 A * 12/1987 Patrin ....................... 280/217
6,360,838 B1 * 3/2002 Kulhavy .................... 180/219
2005/0016800 A1 * 1/2005 Kasten ................. 188/218 XL

FOREIGN PATENT DOCUMENTS

WO     WO 2004/026649 A1 * 4/2004

* cited by examiner

*Primary Examiner*—Christopher P. Schwartz

(57) ABSTRACT

The rotation of an automotive tarmac wheel with tire having integral gear teeth (10) is translated into counter rotation of a an associated brake disk having integral gear teeth (16) through the use of a spin translation gear (18) which is mounted to the wheel axel mounting frame (26). This counter rotation acts to counteract the gyroscopic reaction moments induced by the application of off-axis torques to the tarmac wheel and axel assembly. The brake disk is rotationally separated from the tarmac wheel and is allowed to rotate about the wheel axel (12) via a separate brake disk roller bearing (28). The spin translation gear meshes with the tarmac wheel gear teeth and the brake disk gear teeth to create rotational direction translation and is held in place via a spin translation gear axel (20), translation gear roller bearing (22), and translation gear mounting frame (24). The translation gear mounting frame (24) is rigidly attached to the wheel axel mounting frame (26).

2 Claims, 1 Drawing Sheet

Side View

Rear View

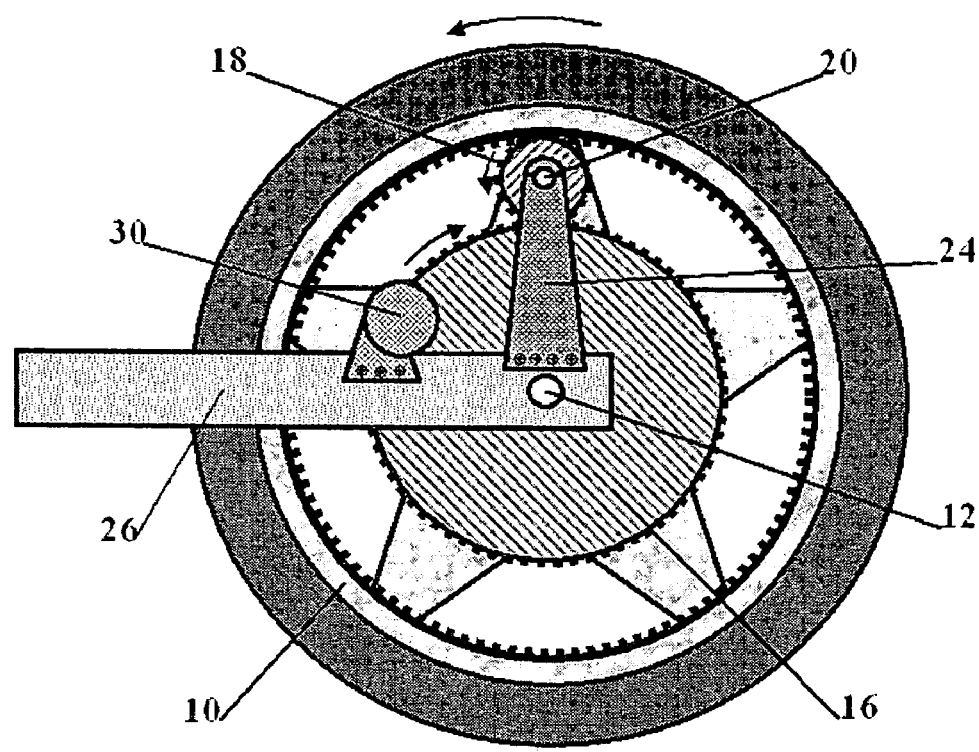
Figure 1. Side View
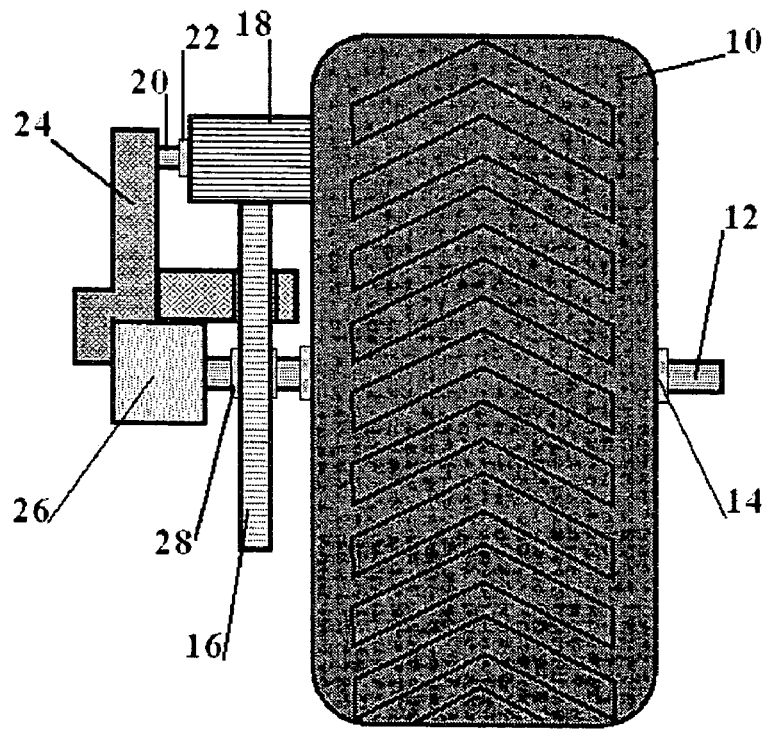
Figure 2. Rear View

AUTOMOTIVE WHEEL ANTI-GYRO

CROSS REFERENCES TO RELATED APPLICATIONS

This application claims the benefit of
1) Document Disclosure #567822 record on Jan. 5th, 2005
2) Provisional Patent Application #60/55398 recorded Feb. 24th, 2005

BACKGROUND—FIELD OF INVENTION

Machine/Mechanical/Automotive:

This invention relates to the cancellation or reduction of gyroscopic forces created by the rotation of road-contacting wheels in autombile and motorcycle vehicles.

BACKGROUND—DESCRIPTION OF PRIOR ART

Rotating automobile and motorcycle wheels in contact with tarmac create gyroscopic reaction forces to off-axis rotational inputs that result from driver steering and road couture variations. These forces must be counteracted to maintain roadworthy vehicle attitude and control stability. Today, these forces are counteracted through the use of mechanical support structures which are fabricated and configured to be strong enough in torsion, compression, and tensile strength to fight gyroscopic reaction forces and maintain intended vehicle road control.

These structural solutions require the addition of vehicle frame and suspension mass to provide the strength necessary to counteract and control gyroscopic reaction forces. As tarmac translation speeds increase, gyroscopic resistance and turning reaction torques increase. When chassis and suspension stability limits are reached, gyroscopic reaction forces to vehicle turning can result chassis and suspension oscillation and associated wheel chatter. In motorcycle applications, the gyroscopic resistance of the rear wheel will require the rider to apply greater and greater steering force as tarmac speed is increased.

Extensive prior art exists for automotive chassis design that provides strength and stability at minimum mass. However, no prior art can be found that operates to counteract the gyroscopic forces of rolling tarmac wheels using counter-rotating mass to create opposing gyroscopic forces.

SUMMARY INCLUDING OBJECTS AND ADVANTAGES

An apparatus for counteracting the gyroscopic reaction forces caused by the application of off-axis torques to rotating automotive tarmac wheel and braking systems comprising a machine gear rigidly attached to the inner rim of tarmac wheel, a machine gear rigidly attached to the outer rim of the brake disk which is allowed to rotate freely from the tarmac wheel, and a rotation translation machine gear which translates the rotation of the tarmac wheel into a counter-rotation of the brake disk. The relative masses and mass distributions of the wheel and brake disk can be adjusted along with the translation gear size (translation ratio) to provide control over the degree to which gyroscopic forces are counteracted.

By extension, this would apply to a plurality of translation gear and brake disc configurations, if necessary.

OBJECTS AND ADVANTAGES

Accordingly, several objects and advantages of this invention are to provide an apparatus for fabrication and retrofit of existing automotive wheel braking systems that can be setup to reduce or eliminate the gyroscopic reaction forces caused by spatial translations of rolling wheel spin axes induced by driver steering or road contour variations that minimizes the addition of required apparatus mass, uses the rotational mass of existing brake disks by forcing them to counter-rotate relative to the spinning wheel, and does not interfere with the operation of tarmac wheels or attached braking systems.

Still further objects and advantages will become apparent from a consideration of the ensuing description and accompanying drawings.

BRIEF DESCRIPTION OF THE DRAWINGS

FIG. 1 is a perspective view of the invention showing a tarmac wheel and brake disk connected by a spin translation gear mounted by a rigid structure to the wheel's axel support frame.

FIG. 2 shows the decomposition of the wheel, brake disk, and translation gear structure indicating the detachment of the brake disk from the wheel to allow counter rotation of the brake disk relative to the rotation of the tarmac wheel via use of its own axel bearing.

REFERENCE NUMERALS

10 Tarmac wheel with tire having integral gear teeth
12 Wheel axel
14 Wheel axel roller bearing
16 Brake disk having integral gear teeth
18 Spin translation gear
20 Spin translation gear axel
22 Translation gear roller bearing
24 Translation gear mounting frame
26 Wheel axel mounting frame
28 Brake disk roller bearing
30 Brake caliper

SUMMARY OF THE INVENTION

An apparatus for counteracting the gyroscopic reaction moments generated by automotive and motorcycle tarmac wheels when turning torques are applied comprising: a wheel with rigidly mounted gear teeth along its inner rim; a brake disk detached from the wheel and rotationally mounted to the wheel axel having rigidly mounted gear teeth along its outer rim; a rotation translation gear rotationally connected to a separate axel and held rigidly between the gear teeth of the wheel and the gear teeth of the brake disk via structure rigidly mounted to the wheel axel carrier frame. When the tarmac wheel is rotated, the brake disk is counter-rotated. The counter-rotation of the brake disk operates to counteract the gyroscopic reaction moments created by the tarmac wheel when steering related torques are applied. The reduction of gyroscopic reaction moments results in reduced vehicle chassis loading and enhanced driving stability.

PREFERRED EMBODIMENT—DESCRIPTION

As shown in FIG. 1, this invention pertains to an automotive tarmac wheel with tire having integral gear teeth 10 which is allowed to spin upon an wheel axel 12 via a wheel axel bearing 14. The tarmac wheel with tire having integral gear teeth 10 is mechanically connected to a brake disk having integral gear teeth 16 via a spin translation gear 18 which is allowed to spin upon a spin translation gear axel 20 via a translation gear bearing 22. The spin translation gear axel 20 is rigidly mounted to a translation gear mounting frame 24 that is rigidly mounted to the wheel axel mounting frame 26. As shown in FIG. 2, this invention uses a separate brake disk bearing 28 mounted upon the wheel axel 12 (or an axel of close spatial proximity). The spin translation gear allows the brake disk to spin counter to the tarmac wheel once the tarmac wheel is put into motion. A brake caliper 30 is presented to complete the braking system, consistent with conventional automotive braking systems.

The presented drawings illustrate a motorcycle rear wheel configuration which is expected to be the most popular application of the invention.

PREFERRED EMBODIMENT—OPERATION

When off-axis (axes other than that of the wheel spin axis) torques are applied to the tarmac wheel/brake disk assembly, the inertial momentum (also known as gyroscopic inertia) of the tarmac wheel will cause a gyro reaction moment (GRM). The GRM will act to turn the positive end (in accordance with the right-hand rule) of the spin axis towards the positive end of the off-axis torque axis. The GRM is described and studied by James B. Scarborough (1958), The Gyroscope Theory and Applications, Interscience Publishers, Inc, NY.

The spin of the tarmac wheel is translated into a counter-rotational spin of the brake disk via the spin translation gear. The counter-rotation of the brake disk acts to create a GRM which opposes that of the tarmac wheel. The magnitude of the opposing gyroscopic force is a function of the spin rate and mass of the brake disk and obeys the laws of inertial momentum ($I_w = \frac{1}{2} mw_2$; where $I_w$ is the angular moment of inertia, m is the mass of the disk, and w is the angular velocity).

Full cancellation of the tarmac wheel's gyroscopic force will only occur if the angular momentum of the counter-rotating brake disk equals that of the tarmac wheel ($I_w$ (wheel)=$I_{w(disk)}$). For this reason, it is anticipated that brake disk, wheel, and translation gear size and mass variations will occur in applications of this invention. Translation gear size could be selected to adjust wheel to brake disk rotational velocity translation ratios. Brake disk and wheel size and mass could be selected and adjusted to control the degree of GRM cancellation.

As the tarmac wheel is made to roll across the tarmac, a counter rotational spin is induced upon the brake disk. As the brake caliper 30 is made to crimp upon the disk and slow the rotation of the brake disk (an operation of conventional automotive disk braking systems), the spin translation gear will act to slow the rotation of the tarmac wheel to produce the stopping force necessary to slow and stop the vehicle's motion across the tarmac.

In two wheeled motorcycle vehicles, reduction of rear wheel GRM forces will reduce required steering toques making the vehicle easier to maneuver as well as reduce mechanical stress loading on chassis structure components at highway speeds. However, since vehicle steering is controlled using the GRM of the front wheel, caution is advised when applying this invention to motorcycle front wheels. Total cancellation of GRM or resultant reversal may destabilize steering and will cause the vehicle to steer abnormally.

OTHER EMBODIMENTS

General Automotive Wheel/Braking Systems—Description

This invention is applicable to all automotive driven or non-driven wheel with integrated disk braking systems. While its physical structure may differ in configuration, all components of the invention and their relationships to one another apply to achieve the same gyroscopic force cancellation from a count-rotation of the associated brake disk.

General Automotive Wheel/Braking Systems—Operation

This embodiment operates in the same way as does the main embodiment for each wheel and braking system it is applied to. However, when applied to car or truck steered or non-steered wheels, GRM forces resulting from wheel turning torques are reduced thereby reducing resultant chassis structural stresses to minimize the potential for dynamic chassis structural oscillations. Such oscillations can cause wheel chatter and effect vehicle stability.

CONCLUSIONS, RAMIFICATIONS, AND SCOPE

Accordingly, it can be seen that this invention has application to all automotive and motorcycle tarmac wheel and disk braking systems. It can be applied in both new construction or as a retrofit to original equipment manufacturer (OEM) equipment. Its operation is designed to provide a physical means by which the gyroscopic forces resulting from the application or toques to tarmac wheels at axes other than the tarmac wheel's spin axis can be counteracted. Gearing mechanisms attached to the tarmac wheel, the brake disk, and a rotation translation gear act to spin an associated brake disk in a direction that is counter to that of the spinning tarmac wheel.

The counter-rotating brake disk will generate gyroscopic reaction moments that counter those generated by the tarmac wheel when off-axis torques are applied to it. While brake disk mass, mass distribution, and angular velocity relative to that of the tarmac wheel will determine the degree of cancellation, reduction of gyroscopic reaction moments to off-axis torques will act to reduce vehicle steering chatter or steering system vibrations that result when steered wheels are turned and will thereby increase steering stability. Such gyroscopic moment cancellation can also reduce vibration and perturbations imparted to the automotive chassis when tarmac wheels are turned or driven through varying tarmac road contours. Associated chassis stabilization will contribute to vehicle driving stability and provide the potential for chassis structural mass reduction.

Although the description above contains many specificities, these should not be interpreted as limiting the scope of the invention but as merely providing illustrations of some of the presently preferred embodiments of this invention. Various other embodiments and ramifications are possible within it's scope. For example, the chassis of a motorcycle at high speeds entering a right-hand sweeping turn will experience swing arm flexure as the wheel's gyroscopic reaction moment acts to counter the off-axis torque induced by the rider's leaning of the vehicle into the turn. Since a motorcycle's front wheel's gyroscopic reaction moments act to provide vehicle steering, it is recommended that caution be applied when attempting to apply this invention to the front wheels of motorcycles. In such applications, care should be taken to ensure that complete gyroscopic reaction moment cancellation is not attained.

Thus, the scope of the invention should be determined by the appended claims and their legal equivalents, rather than by the examples given.

I claim:

1. A gyroscopic reaction moment reduction apparatus for an automotive tarmac wheel and integral braking systems comprising: a gear tooth assembly rigidly mounted to the inner rim of a tarmac wheel; a gear tooth assembly rigidly mounted to the outer rim of at least one accompanying wheel brake disk which is rotationally connected to an axel of the tarmac wheel, or its co-axial equivalent; at least one rotation translation gear, rotationally connected to a translation gear axel, rigidly mounted to a wheel axel carrier structure.

2. The at least one rotation translation gear of claim 1 is configured to translate the rotation of the tarmac wheel into a counter-rotation of the at least one accompanying brake disk.

* * * * *